US010560968B2

(12) United States Patent
Splitz et al.

(10) Patent No.: US 10,560,968 B2
(45) Date of Patent: Feb. 11, 2020

(54) BROADCAST MESSAGING

(71) Applicant: Mueller International, LLC, Atlanta, GA (US)

(72) Inventors: David Edwin Splitz, Sandwich, MA (US); Dale McLeod Magley, Norton, MA (US); Brent Dukes, Raynham, MA (US)

(73) Assignee: Mueller International, LLC, Atlanta, GA (US)

(*) Notice: Subject to any disclaimer, the term of this patent is extended or adjusted under 35 U.S.C. 154(b) by 0 days.

(21) Appl. No.: 15/621,619

(22) Filed: Jun. 13, 2017

(65) Prior Publication Data

US 2018/0359778 A1    Dec. 13, 2018

(51) Int. Cl.
*H04W 74/08* (2009.01)
*H04W 74/04* (2009.01)

(52) U.S. Cl.
CPC ......... *H04W 74/085* (2013.01); *H04W 74/04* (2013.01)

(58) Field of Classification Search
CPC ..... H04W 74/085; H04W 74/04; H04W 4/30; H04W 72/005; H04W 84/18;
(Continued)

(56) References Cited

U.S. PATENT DOCUMENTS

| 6,100,817 A * | 8/2000 | Mason, Jr. ............ G01D 4/004 340/870.02 |
| 2003/0227934 A1* | 12/2003 | White ................... H04L 1/1854 370/432 |

(Continued)

FOREIGN PATENT DOCUMENTS

| WO | 2018231264 | 12/2018 |
| WO | 2019035852 | 2/2019 |

OTHER PUBLICATIONS

Splitz, David Edwin; International Search Report and Written Opinion for PCT Application No. PCT/US17/50392; filed Sep. 7, 2017, dated Nov. 22, 2017, 9 pgs.

(Continued)

*Primary Examiner* — Hoang-Chuong Q Vu
(74) *Attorney, Agent, or Firm* — Taylor English Duma LLP

(57) ABSTRACT

A method of avoiding response signal collisions includes broadcasting a message from a broadcasting device to a plurality of downstream devices, the message containing timing instructions specifying a time at which each downstream device should send its response to the message after successfully receiving the message, and determining whether every downstream device targeted in the message successfully received the message. A method of processing a message includes analyzing, by a downstream device in a communication network, filtering information in a received message to determine whether the filtering information targets the downstream device, and responsive to determining that the filtering information targets the downstream device, determining, by the downstream device, whether the message requires a response, and responsive to a determination that the message requires a response, analyzing timing information in the received message to determine response timing, and scheduling a response as defined in the timing information.

10 Claims, 6 Drawing Sheets

(58) Field of Classification Search
CPC ............ H04W 45/16; H04W 12/1868; H04W 12/1872; H04W 4/06; H04W 4/08; H04W 4/70; H04H 60/32; H04L 12/189; G01D 4/004; G01D 4/006; Y02B 90/242; Y02B 90/246; Y04S 20/42; Y04S 20/322
See application file for complete search history.

(56) References Cited

U.S. PATENT DOCUMENTS

| | | |
|---|---|---|
| 2005/0108288 A1 | 5/2005 | Hartshorne et al. |
| 2005/0201312 A1* | 9/2005 | Archacki, Jr. ......... H04H 60/32 370/312 |
| 2006/0010437 A1 | 1/2006 | Marolia |
| 2007/0076739 A1* | 4/2007 | Manjeshwar ....... H04L 12/1868 370/432 |
| 2008/0068994 A1* | 3/2008 | Garrison Stuber .... G01D 4/004 370/230 |
| 2008/0163078 A1* | 7/2008 | Van Der Sanden .... G06F 9/451 715/762 |
| 2008/0184341 A1 | 7/2008 | Sebesta |
| 2009/0112979 A1 | 4/2009 | Millican et al. |
| 2009/0180651 A1 | 7/2009 | Hilpisch |
| 2010/0157889 A1* | 6/2010 | Aggarwal ............. H04L 45/125 370/328 |
| 2013/0077552 A1* | 3/2013 | Lee ..................... H04W 72/042 370/312 |
| 2013/0195022 A1 | 8/2013 | Nguyen et al. |
| 2014/0013377 A1 | 1/2014 | Straub |
| 2014/0173579 A1 | 6/2014 | McDonald |
| 2014/0269521 A1 | 9/2014 | Economy |
| 2014/0282482 A1 | 9/2014 | Enns |
| 2015/0099555 A1* | 4/2015 | Krishnaswamy ....... H04W 4/70 455/509 |
| 2015/0173072 A1* | 6/2015 | Frederiksen ........ H04L 12/1868 370/312 |
| 2015/0223028 A1* | 8/2015 | Wang ...................... H04W 4/70 370/312 |
| 2015/0373627 A1* | 12/2015 | Ryu ...................... H04W 48/16 455/434 |
| 2016/0006837 A1* | 1/2016 | Reynolds ............... H04W 84/18 709/203 |
| 2016/0277201 A1* | 9/2016 | Thubert .............. H04L 12/1881 |
| 2017/0063566 A1 | 3/2017 | Seminario et al. |
| 2017/0142639 A1* | 5/2017 | Meredith .............. H04W 48/10 |
| 2017/0251347 A1* | 8/2017 | Mehta ..................... H04W 4/90 |
| 2019/0058630 A1 | 2/2019 | Magley et al. |

OTHER PUBLICATIONS

Magley, Dale McLeod; International Search Report and Written Opinion for PCT Application No. PCT/US17/50391; filed Sep. 7, 2017, dated Nov. 22, 2017, 10 pgs.

Magley, Dale McLeod; Non-Final Office Action for U.S. Appl. No. 15/677,138, filed Aug. 15, 2017, dated Dec. 13, 2019, 31 pgs.

* cited by examiner

BROADCAST MESSAGING

TECHNICAL FIELD

This disclosure relates to networks, and more specifically, to data communications between devices in a network.

BACKGROUND

A utility provider, such as a gas, electricity, or water provider, may have a large number of control, measuring, and sensing devices installed in the field in order to control transmission and distribution of the product, measure, and record product usage, and detect problems. Such devices may include water, gas, or electrical meters, remotely controlled valves, flow nodes, leak detection devices, and the like. Utility meters may include wireless communication capability to send and receive wireless communications with a remote communication device, enabling remote reading of meters. Advanced Metering Infrastructure (AMI), Automatic Meter Reading (AMR), and Advanced Metering Management (AMM) are systems that measure, collect, and analyze utility data using advanced metering devices such as water meters, gas meters, and electricity meters.

A typical network may include thousands of nodes. A "node" as used herein may refer to either a composite device in a network capable of performing a specific function or a communication module connected to such a device and configured to provide communications for the device. The network may also include a device known as a repeater, which receives a signal from a central network device, such as a hub, and that regenerates the signal for distribution to other network devices. The hub receives communications from a server. The server may originate the sending of a message to downstream devices in the network, either directly to each of those devices individually, or as a broadcast to the devices collectively. As used herein, "broadcast" includes sending a message that seeks to generate a response from more than one downstream device in a network. Broadcasting a single message to a plurality of downstream devices in the network (such as nodes) may save time and power compared with sending the identical message directly to each downstream device individually, which can take several hours or longer, depending on the number of downstream devices to be contacted. While broadcasting may represent an improvement over performing repeated messages for each individual node, broadcasting presents (among other problems) the problem of response signal collisions, because a network may include potentially thousands of downstream devices that may send response signals back simultaneously, which risks overwhelming devices (hub, server, etc.) when attempting to process each response signal.

SUMMARY

Disclosed is a method (and devices providing methods disclosed herein) for a downstream device in a communication network to process to a broadcast message or to a direct message, comprising analyzing, by a downstream device, filtering information in a received message to determine whether the filtering information targets the downstream device, and responsive to determining that the filtering information targets the downstream device, determining, by the downstream device, whether the message requires a response, and responsive to a determination that the message requires a response, analyzing timing information in the received message to determine response timing, and scheduling a response as defined in the timing information.

In another aspect of the current disclosure, a method of avoiding response signal collisions comprises broadcasting a message from a broadcasting device to a plurality of downstream devices, the message containing timing instructions specifying the time at which each downstream device is to send its response to the message after successfully receiving the message, and determining whether every downstream device targeted in the message successfully received the message.

The system and methods herein disclosed can cause the sending of a broadcast message to large numbers of downstream devices in a network, while minimizing the likelihood of response collisions at the server. For any messages intended for only a subset of downstream devices in the network, as opposed to all downstream devices in the network, the disclosed system allows a user to customize a broadcast so as to obtain responses from only a targeted group of downstream devices.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawing, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

Figure 1:
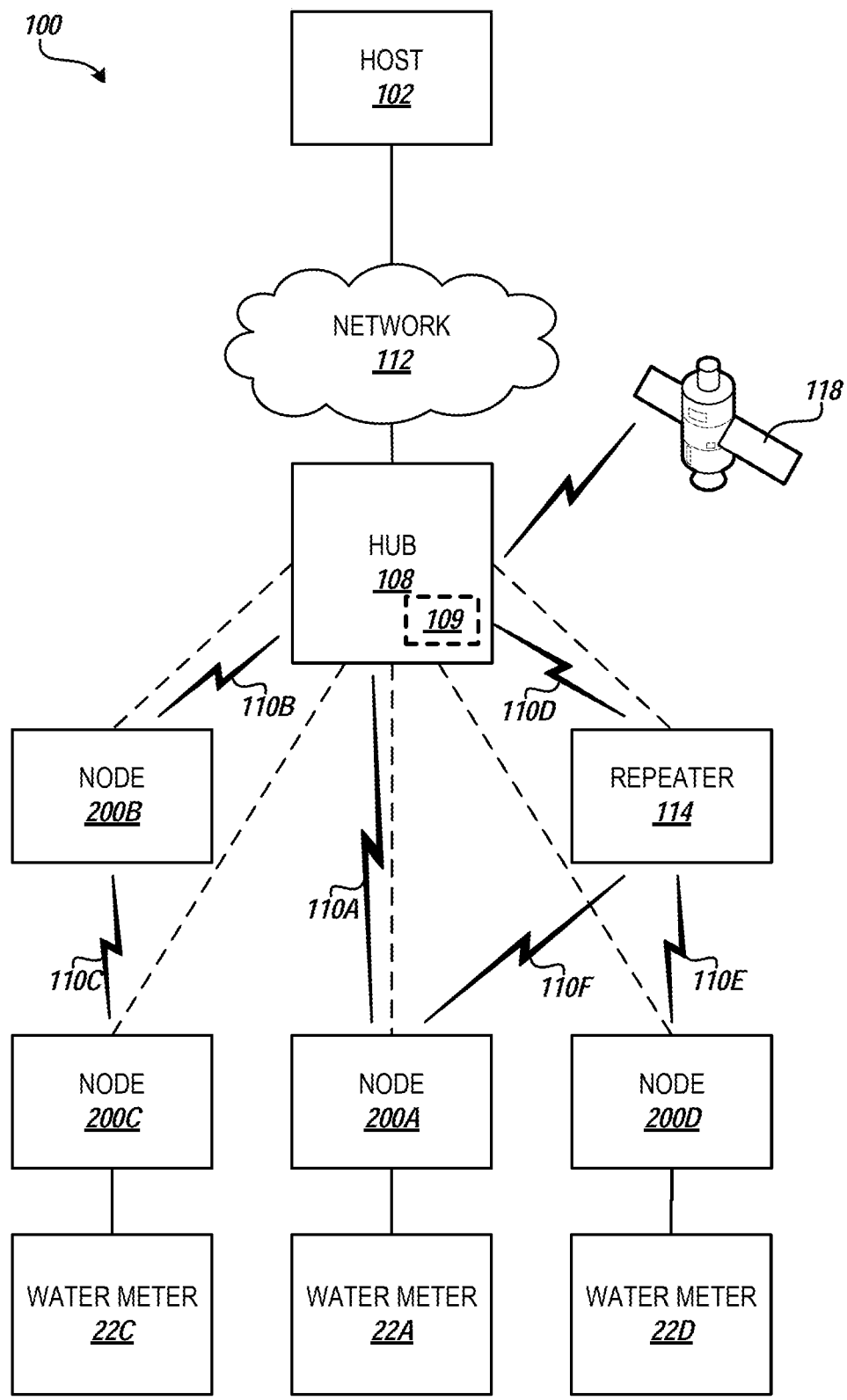
FIG. 1 is a block diagram showing one example of an AMI network topology, according to embodiments described herein.

FIG. 1 is a block diagram showing one example of a network topology of an illustrative fixed AMI system 100, such as that implemented by a utility provider. The present disclosure refers to several devices in an AMI system as either transmitting or receiving broadcast messages, but the methods described in the present disclosure are not to be strictly limited to fixed AMI systems, as such methods can also be used in networks that include, among others, attributes of both AMI and AMR systems, such as those disclosed in U.S. patent application Ser. No. 15/161,448, filed May 23, 2016, now U.S. Pat. No. 10,097,411, which is hereby incorporated by reference in its entirety.

The AMI system 100 may include utility provider systems, such as host 102. The host 102 may represent a combination of application servers, database servers, communication servers, web servers, and the like that comprise the systems of the utility provider used to collect data from, control, and manage the various nodes 200A-200D (referred to herein generally as nodes 200) in the AMI system 100. For example, as shown in FIG. 1, nodes 200C, 200A, 200D may be respectively connected to water meters 22C, 22A, 22D and provide AMI network communications for the devices. For ease of reference, types of nodes other than hubs 108 (described below) will hereinafter be assigned the general reference numeral 200, unless stated otherwise, with the understanding that nodes 200 may have a construction according to the description of FIG. 2, to be described herein.

According to various embodiments, the host 102 may communicate with downstream devices, including the nodes 200 through one or more collection hubs 108. As used herein, "downstream device" includes any device within the system 100, other than the host 102, that is configured to receive any communication originating from the host 102, including from any server comprising the host 102, in whole or in part. Stationary, or fixed, collection hubs 108 may comprise specialized network nodes installed in the field that act as a "parent node" for a set of assigned child nodes 200A-200D that communicate with the hub 108 through various communication links 110A-110E (referred to herein generally as communication links 110). The communication links 110 may include wireless communication links, such as RF communication links, among others. Owing to a stationary transceiver 109 housed in each hub 108, the communication across the communication links 110 is two-way. The collection hubs 108 may periodically collect usage data, node data, and other data from the child nodes 200 and forward data to the host 102 over a network 112. The collection hubs 108 may also forward messages received from the host 102 over the network 112 to the target child node(s) 200. The network 112 may comprise various networking technologies that connect the collection hubs 108 in the field to the host 102, including (among others) cellular data networks, Wi-Fi or WiMAX networks, satellite communication networks, metropolitan-area networks ("MANs"), wide-area networks ("WANs"), the Internet, and the like.

The collection hub 108 may communicate with its child nodes 200A-200D either directly or through one or more intermediary devices. For example, the AMI system 100 may include repeaters 114 that facilitate communication between the collection hub 108 and remote nodes, such as node 200D. According to further embodiments, some nodes may be configured to act as repeaters, referred to herein as "buddy nodes," such as node 200B shown in FIG. 1. It will be appreciated that some nodes in the AMI system 100, such as node 200A, may be located such that they receive messages from the collection hub 108 both directly and by way of one or more repeaters 114 or buddy nodes 200B.

According to some embodiments, the collection hubs 108 may include or be connected to an accurate time source 118. For example, a collection hub 108 may be GPS-enabled and able to receive a highly accurate time value from a GPS receiver. Other accurate time sources 118 may include a cellular network connection, an integrated accurate real-time clock component, and the like. Because collection hubs 108 may be connected to fixed power sources, these devices may be able to maintain accurate current time without the need for reduced power consumption required by other, remote nodes 200. It will be appreciated that the configuration of the network comprising the AMI system shown in FIG. 1 and described above is merely one configuration, and additional devices and/or alternative configurations may be conceived by one skilled in the art. As such, the network topology shown in FIG. 1 and the network configurations described should not be seen as limiting but, instead, as merely exemplary.

The communication links shown in FIG. 1 represent a network or networks that may comprise hardware components and computers interconnected by communications channels that enable sharing of resources and information. The network may comprise one or more of a wired, wireless, fiber optic, or remote connection via a telecommunication link, an infrared link, a radio frequency link, a cellular link, a Bluetooth® link, or any other suitable connectors or systems that provide electronic communication. The network may comprise intermediate proxies, routers, switches, load balancers, and the like. The paths followed by the network between the devices as depicted in FIG. 1 represent the logical communication links between nodes (such as 200B and 200C), between a node 200 and the hub 108, or between nodes 200 and the repeater 114, not necessarily the physical paths or links between and among the devices.

Figure 2:
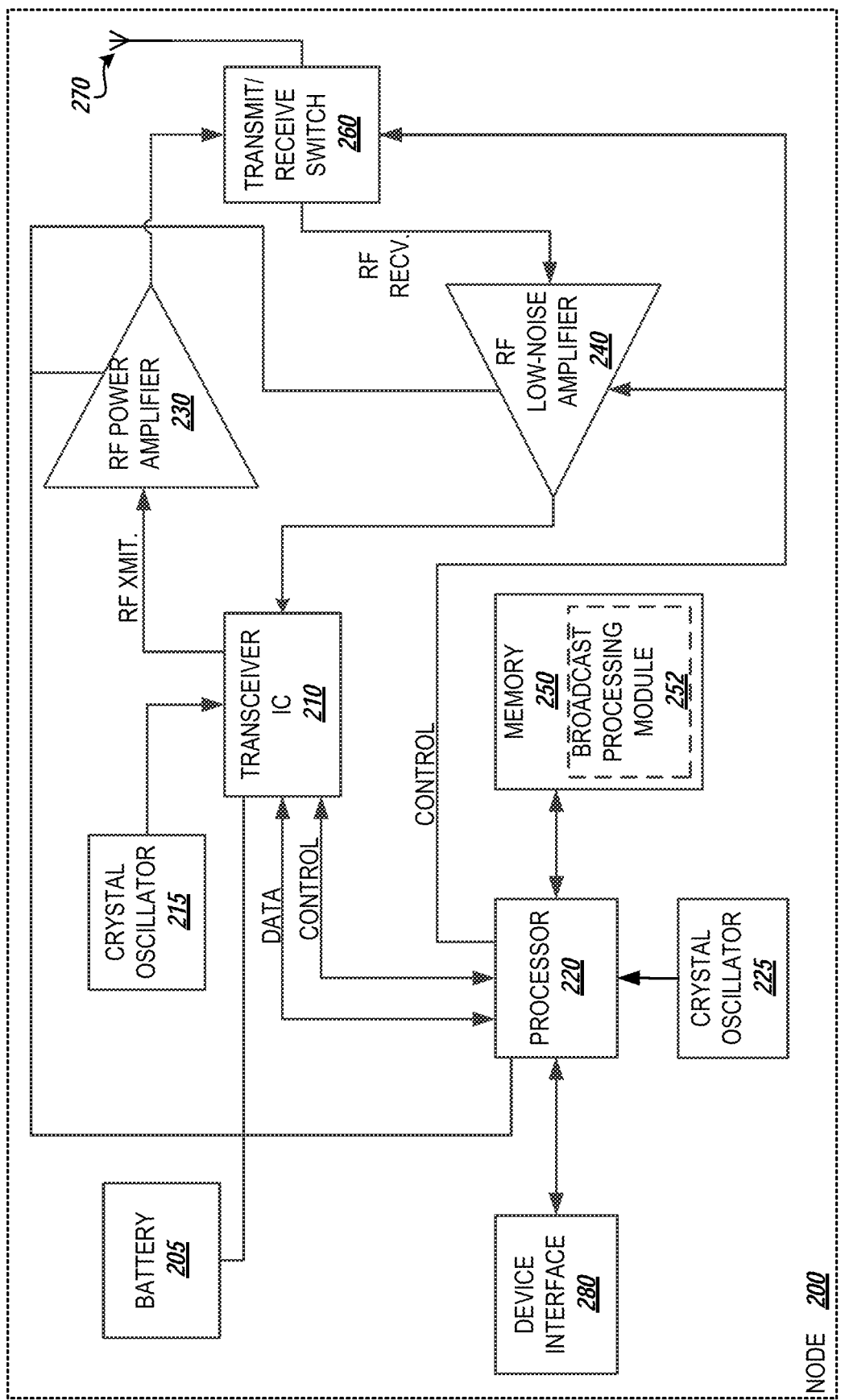
FIG. 2 is a block diagram of a node according to certain embodiments described herein.

FIG. 2 shows a block diagram of components of an illustrative node 200 configured for RF communication in AMR and AMI networks. In other words, the node 200 is able to operate in an AMI mode or in a modified AMR mode (the latter mode described in the copending application incorporated by reference above). The node 200 may allow data to and from devices in the AMI system 100, such as water, gas, or electrical meters, remotely controlled valves, flow nodes, leak detection devices, collection hubs 108, repeaters 114, and the like, to be communicated over the wireless AMI network. For example the node 200 may be implemented in or connected to a water meter in order to transmit usage data as well as, in some implementations, audio recording data to the host 102 for leak detection. According to various embodiments, the node 200 may be configured for communication on various radio network topologies, including star, hybrid-star, peer-to-peer, and mesh, among others.

The node 200 may include at least one battery 205 that powers a transceiver integrated circuit ("IC") 210, a processor 220, an RF power amplifier 230, an RF low-noise amplifier 240, a memory 250, and other components. Other embodiments include nodes with fewer elements, e.g., nodes without power amplifiers or low noise amplifiers, among others. Crystal oscillators 215 and 225 are connected to the transceiver IC 210 and the processor 220, respectively. The node 200 further includes a transmit/receive switch 260 and antenna 270. The processor 220 may be a microprocessor, a microcontroller, a field-programmable gate array ("FPGA"), or the like. The processor 220 and the transceiver IC 210 may include both a two-way data and a two-way control line. In some embodiments, the processor 220 includes a control line to each of the RF low-noise amplifier 240 and the transmit/receive switch 260. The processor 220 may also be connected to the memory 250 by a two-way data line.

The memory 250 may comprise a processor-readable storage medium for storing processor-executable instructions, data structures and other information. The memory 250 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 250 may store firmware that comprises commands and data necessary for the nodes 200, collection hubs 108, and repeaters 114 to communicate with other devices in the AMI system 100 as well as perform other operations of the nodes. According to some embodiments, the memory 250 may store a broadcast processing module 252 comprising processor-executable instructions that, when executed by the processor 220, perform at least portions of the method 400 for processing a broadcast message (FIG. 4), as described herein.

In addition to the memory 250, the node 200 may have access to other processor-readable media storing program modules, data structures, and other data described herein for accomplishing the described functions. It will be appreciated by those skilled in the art that processor-readable media can be any available media that may be accessed by the processor 220 or other computing system, including processor-readable storage media and communications media. Communications media includes transitory signals. Processor-readable storage media includes volatile and non-volatile, removable and non-removable storage media implemented in any method or technology for the non-transitory storage of information. For example, processor-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to embodiments, the processor 220 may be further connected to other components of the node 200 through a device interface 280. In some embodiments, the device interface 280 may connect to a metering component, such as a water meter (exemplified in FIG. 1 at 22C, 22A, and 22D), a gas meter, or an electricity meter, that allows the meter to provide usage data to the host 102 through the AMI system 100. In further embodiments, the device interface 280 may connect to nodes or detection components, such as a leak detection device. In still further embodiments, the device interface 280 may connect to a control component, such as an electronically actuated water valve, that allows the host 102 and/or other devices in the AMI system 100 to control aspects of the utility provider's infrastructure. These examples are not meant to be limiting, and those of skill in the art will recognize that alternative device components that may be interfaced with the node 200 through the device interface 280. For example, the device interface 280 may connect to a control component (valve actuator) and a data reading port (water meter readings) at the same time.

It will be appreciated that the structure and/or functionality of the node 200 may be different than that illustrated in FIG. 2 and described herein. For example, the transceiver IC 210, processor 220, RF power amplifier 230, RF low-noise amplifier 240, memory 250, crystal oscillators 215, 225, device interface 280 and other components and circuitry of the node 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the node 200 may not include all of the components shown in FIG. 2, may include other components that are not explicitly shown in FIG. 2 or may utilize an architecture completely different than that shown in FIG. 2.

Figure 3:
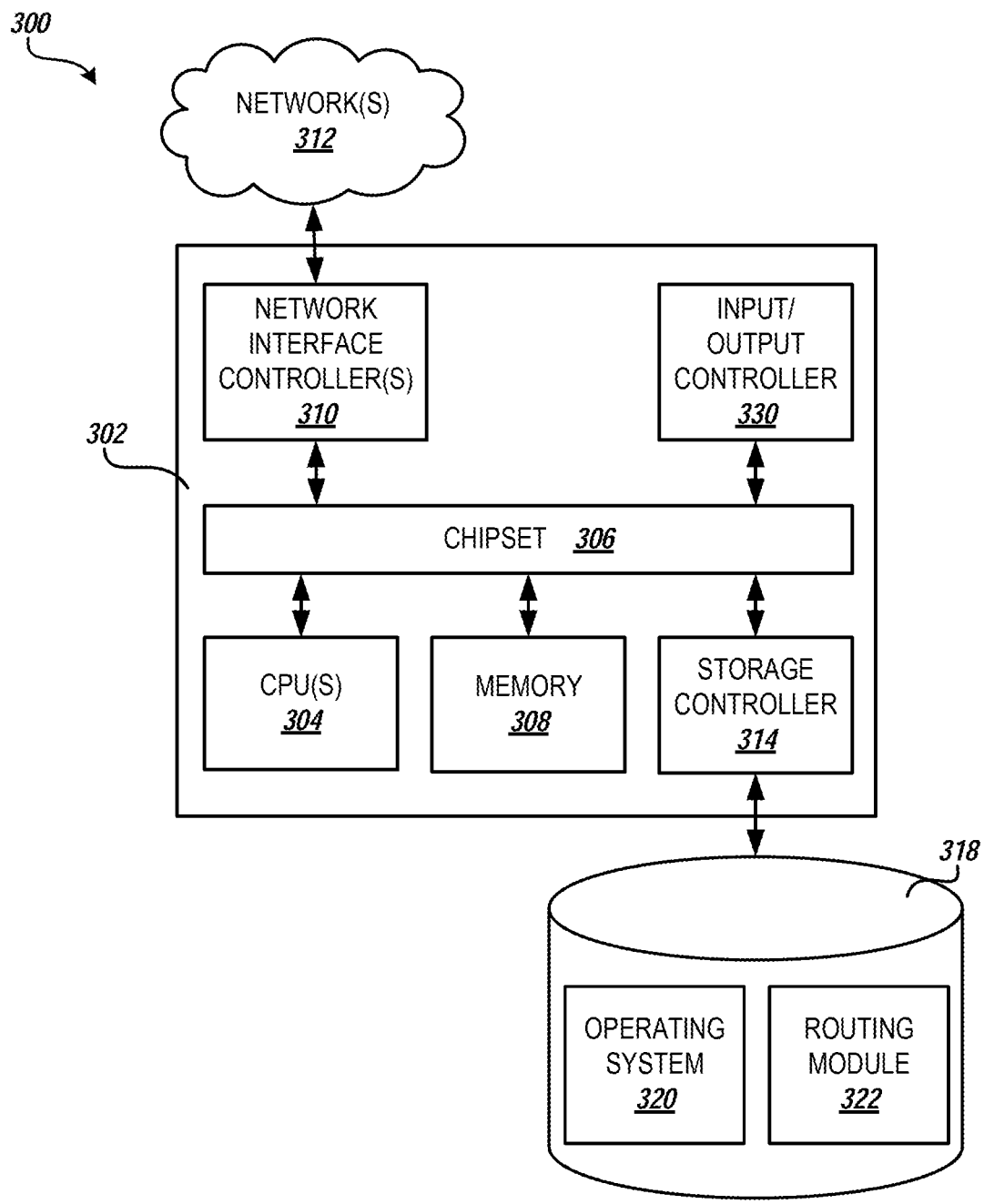
FIG. 3 is a block diagram showing an example computer architecture for a computer capable of executing the software components described herein for the sending of broadcast messages to nodes, and for the processing of responses received from the nodes, according to embodiments described herein.

FIG. 3 shows an example computer architecture 300 for a computer 302 capable of executing the software components described herein for the sending of broadcast messages to downstream devices, and for the processing of responses received from the downstream devices. The computer architecture 300 (also referred to herein as a "server") shown in FIG. 3 illustrates a server computer, workstation, desktop computer, laptop, or other computing device, and may be utilized to execute any aspects of the software components presented herein described as executing on the host 102 (FIG. 1), or other computing platform. The computer 302 preferably includes a baseboard, or "motherboard," which is a printed circuit board to which a multitude of components or devices may be connected by way of a system bus or other electrical communication paths. In one illustrative embodiment, one or more central processing units ("CPUs") 304 operate in conjunction with a chipset 306. The CPUs 304 can be programmable processors that perform arithmetic and logical operations necessary for the operation of the computer 302.

The CPUs 304 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like. With regard to method 500 of the present disclosure, to be discussed herein with regard to FIGS. 5 and 6, the memory 308 may store a "first list" that recites identifications of all downstream devices from which it is expected to elicit responses to a broadcast message, and memory 308 may also store a "second list" reciting identifications of all downstream devices from which the server actually received responses to the broadcast message.

The chipset 306 provides an interface between the CPUs 304 and the remainder of the components and devices on the baseboard. The chipset 306 may provide an interface to a memory 308. The memory 308 may include a random access memory ("RAM") used as the main memory in the computer 302. The memory 308 may further include a computer-readable storage medium such as a read-only memory ("ROM") or non-volatile RAM ("NVRAM") for storing basic routines that that help to startup the computer 302 and to transfer information between the various components and devices. The ROM or NVRAM may also store other software components necessary for the operation of the computer 302 in accordance with the embodiments described herein.

According to various embodiments, the computer 302 may operate in a networked environment using logical connections to remote computing devices through one or more networks 312, such as the wireless mesh network described herein, a local-area network ("LAN"), a wide-area network ("WAN"), the Internet, or any other networking topology known in the art that connects the computer 302 to the devices and other remote computers. The chipset 306 includes functionality for providing network connectivity through one or more network interface controllers ("NICs") 310, such as a gigabit Ethernet adapter. For example, the NIC 310 may be capable of connecting the computer 302 to the devices 22, 108, 114 in the AMI system 100 (FIG. 1) as well as other computer devices in the utility provider's systems. It should be appreciated that any number of NICs 310 may be present in the computer 302, connecting the computer to other types of networks and remote computer systems beyond those described herein.

The computer 302 may be connected to at least one mass storage device 318 that provides non-volatile storage for the computer 302. The mass storage device 318 may store system programs, application programs, other program modules, and data, which are described in greater detail herein. The mass storage device 318 may be connected to the computer 302 through a storage controller 314 connected to the chipset 306. The mass storage device 318 may consist of one or more physical storage units. The storage controller 314 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 302 may store data on the mass storage device 318 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 318 is characterized as primary or secondary storage, or the like. For example, the computer 302 may store information to the mass storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 302 may further read information from the mass storage device 318 by detecting the physical states or characteristics of one or more particular locations within the physical storage units.

The mass storage device 318 may store an operating system 320 utilized to control the operation of the computer 302. According to some embodiments, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 318 may store other system or application programs and data utilized by the computer 302, such as a routing modules 322 utilized by the computer to dynamically determining and assigning parent nodes and routes for nodes in a mesh network, as described herein.

In some embodiments, the mass storage device 318 may be encoded with computer-executable instructions that, when loaded into the computer 302, transforms the computer 302 from being a general-purpose computing system into a special-purpose computer capable of implementing the embodiments described herein. These computer-executable instructions transform the computer 302 by specifying how the CPUs 304 transition between states, as described above. According to some embodiments, the mass storage device 318 stores computer-executable instructions that, when executed by the computer 302, perform portions of the method 500 for broadcasting a message with timing instructions to targeted nodes, as described herein with regard to FIGS. 5 and 6. In further embodiments, the computer 302 may have access to other computer-readable storage medium in addition to or as an alternative to the mass storage device 318.

The computer 302 may also include an input/output controller 330 for receiving and processing input from a number of input devices, such as a keyboard, a mouse, a touchpad, a touch screen, an electronic stylus, or other type of input device. Similarly, the input/output controller 330 may provide output to a display device, such as a computer monitor, a flat-panel display, a digital projector, a printer, a plotter, or other type of output device. It will be appreciated that the computer 302 may not include all of the components shown in FIG. 3, may include other components that are not explicitly shown in FIG. 3, or may utilize an architecture completely different than that shown in FIG. 3.

Embodiments of the methods and systems are described below with reference to block diagrams and flowchart illustrations of methods, systems, and apparatuses. It will be understood that each block of the block diagrams and flowchart illustrations, and combinations of blocks in the block diagrams and flowchart illustrations, respectively, can be implemented by program instructions. These program instructions may be programmed into programmable processing elements to produce logic that executes on the processing elements to create means for implementing the functions specified in the flowchart block or blocks, which describe and reference specific algorithms and inherent structure for accomplishing the functions as described and further explained herein.

These program instructions may also be stored in a processor-readable memory that can direct a processing apparatus to function in a particular manner, such that the instructions stored in the processor-readable memory produce an article of manufacture including processor-readable instructions for implementing the function specified in the flowchart block or blocks. The program instructions may also be loaded onto a processing apparatus to cause a series of operational steps to be performed on the programmable apparatus to produce a processor-implemented process such that the instructions that execute on the programmable apparatus provide steps for implementing the functions specified in the flowchart block or blocks.

Accordingly, blocks of the block diagrams and flowchart illustrations support combinations of elements for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by general purpose or special purpose hardware-based systems that perform the specified functions or steps, or combinations of special purpose hardware and instructions.

Figure 4:
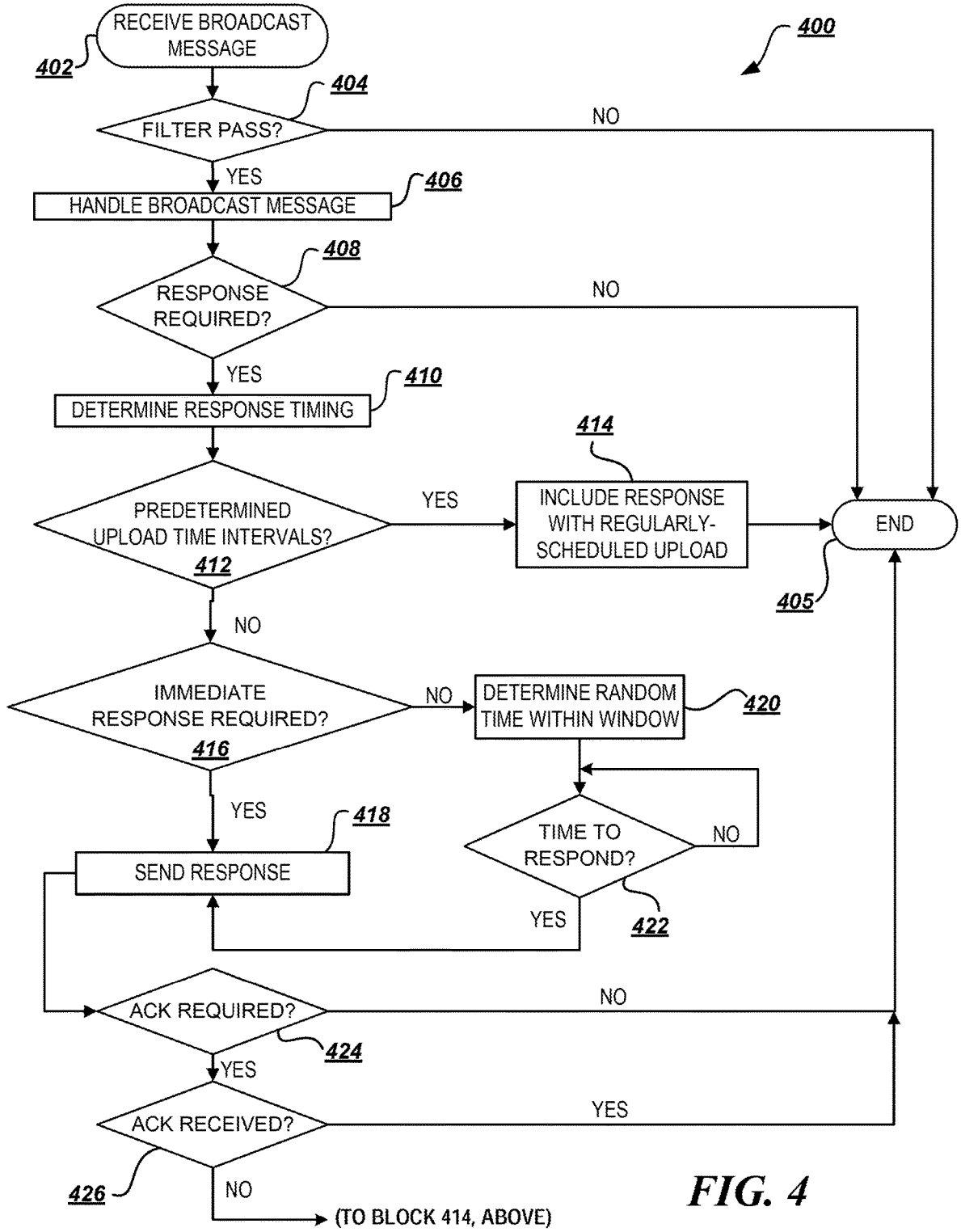
FIG. 4 illustrates a flow diagram of an exemplary method of processing a received broadcast message or a received direct message.

FIG. 4 illustrates a method 400 for processing a received broadcast message or a received direct message, which may be performed by a downstream device such as, among others, the node 200 of the AMI system 100 (FIG. 1). Method 400 can structure responses to many different types of broadcast messages that contain timing instructions, to be described herein. Illustrative examples of broadcast messages include, but are not limited to, a reboot command telling a downstream device to reset, and a Request for More Information, which seeks information about the downstream device receiving that Request. The information obtained from a Request for More Information is sent to a server (such as the server 300 of FIG. 3), so that the server 300 knows and can be updated on the types of devices running in its network. Other examples include instructing downstream devices to take a specified action, including but not limited to instructing a node 200 to close a valve or instructions that simply change contents in the memory 250 (FIG. 2) of the node 200. In other implementations, there are not instructions in the message, but the downstream device is programmed to know how to handle the message, based on information included in the message. The foregoing examples are not intended to be limiting, as it may be possible for the methods of the present disclosure to be used for other types of broadcast messages. Node 200 is referenced with regard to method 400 for exemplary purposes only, and it is to be understood that the method 400 could be performed by any other devices in the AMI system 100 that are capable of receiving broadcast messages, such as, for example, repeaters 114 (FIG. 1).

Method 400 begins at block 402, where the downstream device (such as node 200) receives a broadcast message. In a downstream progression in which a node 200 is the ultimate recipient of a broadcast message, the broadcast message originates from a server (such as the server 300 of FIG. 3) in the host 102. The host 102, via server 300, transmits the broadcast message to a broadcasting device, such as the hub 108 (FIG. 1) or, in some networks, to a collector. The hub 108 (or collector) then disseminates (broadcasts) the broadcast message to certain nodes 200 and, optionally, one or more repeaters 114 (FIG. 1), and from a repeater 114, the broadcast message is further disseminated to certain other nodes 200. A downstream device is "targeted" with filtering information of the type described herein with regard to FIG. 4. In one implementation, when a targeted downstream device sends a response according to timing instructions (also to be described herein with regard to FIG. 4), the response is transmitted in an upstream progression, i.e., in the order of system devices opposite that recited for the aforementioned downstream direction.

From block 402 of FIG. 4, method 400 proceeds to decision block 404, where it is determined by each downstream device whether the downstream device (such as node 200) satisfies all criteria expressed as filtering information set forth in the broadcast message. Broadcast messages sent according to certain aspects of the present disclosure may include both filtering information and timing information. Filtering information specifies the downstream devices from which it is intended to elicit a response to the broadcast message (referred to herein as "targeted downstream devices" or, by way of example, "targeted nodes"), while timing information (also called "timing instructions" herein) specifies the time parameters governing when the node is to send its response to the broadcast message (though some embodiments include broadcast messages that require no response from nodes). These types of information comprise message fields, which are categories of codes, and non-limiting examples of the types and values of filtering information message fields and timing information message fields are discussed below. Not all of the fields described below are required to be used, and other fields could be used to further define filtering information.

Message Fields
Filtering Information (Parameters)
Source Address—This field is the node identification on the sending unit, an alphanumeric code or a number that uniquely identifies an individual broadcasting device, such as a hub 108 (FIG. 1).
Destination Address—This field provides the addresses of nodes that are to receive a message. In one example, for broadcast messages, this field is set to Broadcast Address which could be, in hex format, "0xffffffff."
Node Type—This field denotes the type of hardware or printed circuit board (PCB) present in the node, and is expressed by names or models of nodes, such as "MiNode4," "MiNode-LP," and "LFM." The acronym "LFM" stands for LoRa® Frequency Module," which is a standalone radio to which a data source can be connected, with LoRa® referring to an RF platform developed by Semtech Corporation. If a broadcast message is intended for all types of nodes in the network, then the hex value "0xFF" is entered for this message field, as one example.
Node Subtype—This field reflects the type of device that the node comprises or to which the node is connected, and examples of subtypes include "Water Only" (for a water meter), "RDM" (for a remote-disconnect meter, a meter with a valve), "MiEcho" (an abbreviation for a product sold by Mueller Systems, LLC under the mark "Mi.Echo"), "DC-Repeater" (for a repeater, such as at 114 of FIG. 1, that is battery-powered), or "AC-Repeater" (for a repeater, such as at 114 of FIG. 1, that is AC-powered). If a broadcast message is intended for all subtypes of nodes in the network, then the hex value "0xFF" is entered for this message field, as an example.
Operational Mode—This field reflects the current operational mode of each targeted node, including "warehouse" (for nodes still having factory settings), AMR, and AMI. If a broadcast message is intended for all operational modes, then the hex value "0xFF" is entered for this message field, as one example.

Timing Information
Response Window—This field comprises a byte of binary values, where one nibble of that byte denotes a "Response Type," and the other nibble of that byte denotes "Response Delay," such that the byte can take the form "RespType I RespDelay." The "RespType" nibble indicates, as examples, which may have the following hex values assigned to them:
No response (0x00);
A regularly-scheduled, recurring upload of data collected by the targeted node (such as once a day at a certain hour of each day) (0x10);
A delayed response with an acknowledgement (ACK) signal sent by a parent of the node (which can be either hub 108 or a repeater 114, in the example of system 100) to acknowledge receipt of the node's response to the broadcast message (0x30); and An unacknowledged delayed response, in which the parent does not send an ACK signal after receiving a node's response (0x40). An ACK signal from the parent may not be needed when the parent is able to listen to many channels simultaneously, thus minimizing the chances of response signal collisions. One example of such a broadcasting device is a "super collector" that can listen to 64 channels simultaneously.

In either type of delayed response, the targeted node picks a random time within a predefined time window in which to perform its upload, except for any period in that window that might be designated by the server as a "quiet period," in which no uploads by that node should occur. The "RespDelay" nibble indicates a number of predesignated time intervals, such as 15-minute intervals, following a predefined delay period, such as a 5-minute delay occurring after the targeted node's receipt of a broadcast message, comprising a response window. For example, if the "RespDelay" nibble is set to the value 2, then the response window is 30 minutes wide, starting five minutes after the targeted node receives the broadcast message, and the node responds at any random time within that 30-minute window. For further example, a "RespDelay" nibble reciting the value 0 (zero) means that the node should respond "immediately," i.e., as soon as that same five-minute delay elapses.

Time—This field is the Universal Time Coordinated (UTC) time indicating the current time value retrieved by the collection hub 108, repeater 114, or node 200 from its accurate time source 118 (FIG. 1).

A message number may also be included in the above-described filtering information for a broadcast message, such that for nodes 200 that already successfully received a broadcast of a message with a particular message number, any subsequent message re-broadcasts containing that same message number may be disregarded. This would provide another method for avoiding or reducing response collisions.

Referring again to decision block 404 of FIG. 4, if all the filtering parameters pass, in other words, the node 200 meets all the filtering information contained in the broadcast message received, then the method 400 advances to block 406. If, however, all filtering parameters do not pass, the node 200 determines that the filtering information does not target the node 200, so the node 200 ignores the broadcast message, and the method 400 ends at block 405. At block 406, the downstream device has qualified as a "targeted downstream device" (such as a "targeted node") by virtue of having passed (satisfied) the filtering parameters in block 404, and the targeted node 200 handles the broadcast message, examples of types of broadcast messages described above in the paragraph introducing FIG. 4. As used herein, to "handle" means to react to the contents of a message in some manner other than sending a response, such as by taking an action (closing a valve, for example) or by simply changing the contents of memory of the downstream device receiving the message (such as memory 250 of the node 200 in FIG. 2). Method 400 then advances to decision block 408, where the targeted node determines whether a response to the message is required. This determination may include reading the "RespType" nibble in the timing information described above. If no response is required (for example, the node reads a hex value of 0x00 in the "RespType" nibble), then method 400 ends at block 405. If, however, the node determines at decision block 408 that a response is required, then method 400 advances to block 410, where the node 200 determines response timing based on the timing information contained in the broadcast message. Method 400 then advances to decision block 412, where the targeted node 200 determines whether the "RespType" nibble of the Response Window message field indicates that a response is to be sent during a predetermined periodic (regularly-scheduled) upload of data collected by the target node, such as an upload occurring once every two days, for example. If that indication is present, method 400 advances to block 414, where the targeted node 200 schedules its response to occur during the predetermined periodic upload of data. From block 414, method 400 proceeds to block 405, where the method 400 ends.

As mentioned above, when a downstream device sends its response, it preferably does so in an upstream progression, in one example. In the first stage of that progression, the downstream device sends a hail message (also called a "ping" message) to its parent, receives a "pong" message from the parent, and then, following receipt of the "pong" message, sends its response to the parent. The hailing by the downstream device can be executed according to U.S. patent application Ser. No. 15/583,263, filed May 1, 2017, now U.S. Pat. No. 10,178,617, the disclosure of which is hereby specifically incorporated herein by reference in its entirety.

Referring once again to decision block 412 of FIG. 4, if the "RespType" nibble of the Response Window message field does not indicate that a response is to be sent during a regularly-scheduled data upload, then method 400 proceeds to decision block 416. At decision block 416, the targeted node 200 determines whether an "immediate" response is required, in other words, whether the broadcast message contains a Response Window message field having a "RespDelay" nibble of zero which, as explained above, means that the targeted node 200 should respond as soon as a predetermined post-receipt delay (for example, five minutes) elapses. If such a zero value exists, then method 400 advances to block 414, where the targeted node 200 sends its response. If, however, the "RespDelay" nibble of the Response Window message field contains a nonzero value (examples of which are discussed herein), the method 400 proceeds from decision block 416 to block 420, where the targeted node determines a random time within the response window in which to send its response. As previously explained, a "RespDelay" nibble of "2," for example, means that the response window is 30 minutes wide, starting after the expiration of a predefined delay period commencing at the time at which the targeted node 200 receives the broadcast message, and in such an event the targeted node 200, at block 420, schedules a random time within that response window in which to send its response. Method 400 then advances to decision block 422, where it is determined whether the system time, such as that indicated by the accurate time source 118 of the AMI system 100 (FIG. 1), matches the response time scheduled at block 420. If no such match exists, the method 400 loops back to the arrow following block 420 until the system time does match the scheduled response time. When such a match occurs, the method 400 proceeds from block 422 to block 418, where the targeted node 200 sends its response. The method 400 advances to decision block 424, where it is determined whether the "RespType" nibble requires a delayed response with an ACK signal from the parent of the node, as described above. If not, the method 400 ends at block 405. If so, then the method 400 proceeds to decision block 426, where it is determined whether the targeted node 200 received an ACK signal. If so, the method 400 ends at block 405. If not, method 400 jumps to block 414, meaning that in instances where an ACK signal was required but not received, the targeted node 200 will send another response when it performs its next regularly-scheduled upload.

Figure 5:
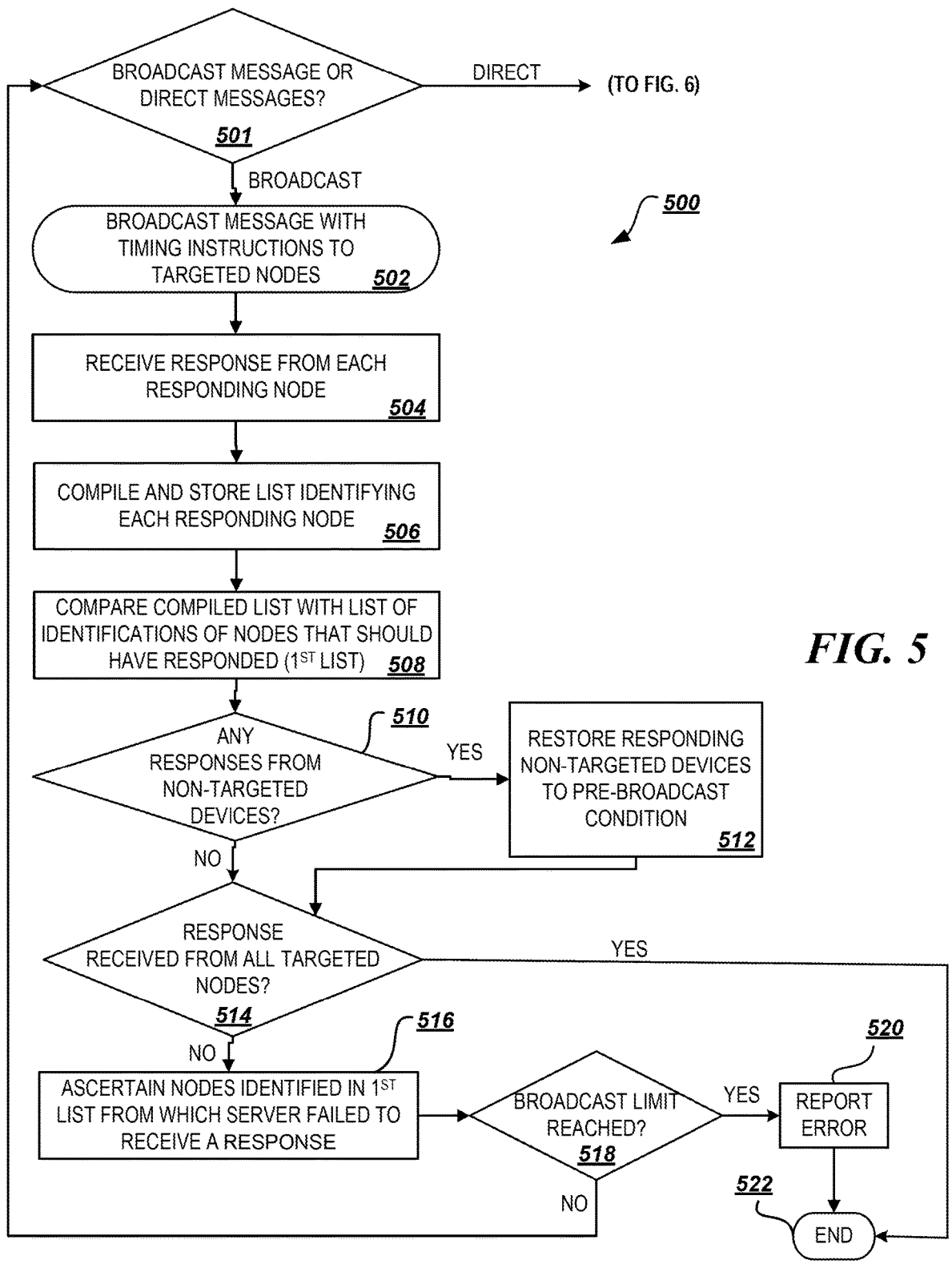
FIGS. 5 and 6 illustrate a flow diagram of an exemplary method of sending either a broadcast message with timing instructions, or direct messages, to targeted nodes.
Figure 6:
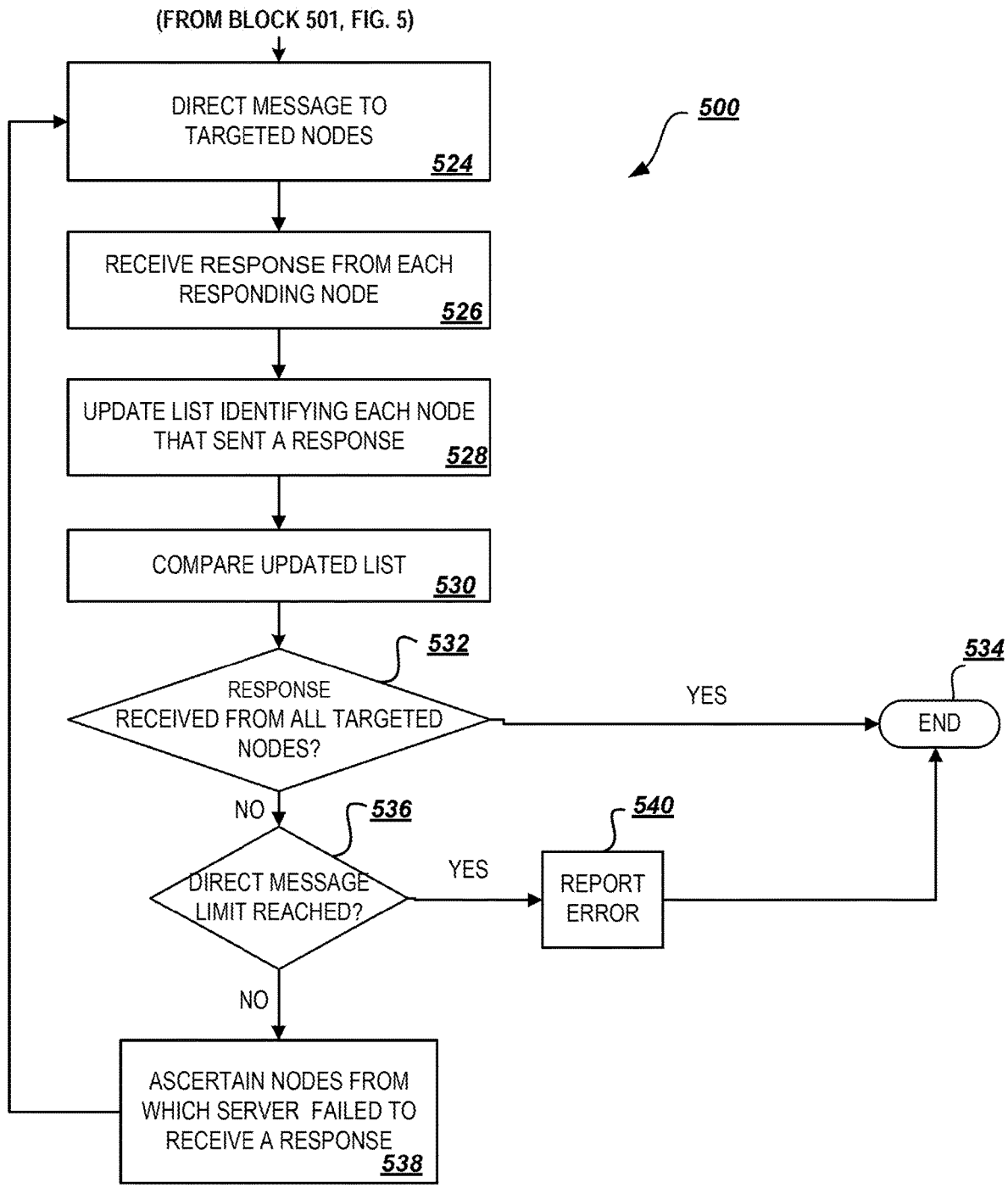

FIGS. 5 and 6 illustrate an exemplary method 500 of sending either a broadcast message with timing instructions, or direct messages, to targeted nodes 200 (FIG. 1). A node 200 can be "targeted" either in the context of a broadcast message when matching filtering information, as discussed above, or in the context of a direct message intended for receipt by one or more nodes identified in the message. Each node 200 listens to a hailing channel for both broadcast messages and hail messages, and is capable of determining whether an incoming message is a broadcast message or, instead, a hail message. Detection of a hail message by a node is disclosed in the copending application incorporated by reference immediately above.

Referring to FIG. 5, method 500 begins at decision block 501, where a determination is made to either send a broadcast message to targeted nodes 200 or, instead, messages individually directed to each targeted node in the network ("direct messages"). The decision made at block 501 depends upon the number of nodes in a system that are designated to receive a message. If that number is below a predetermined threshold number of nodes, then direct messages will be sent, and method 500 skips to block 528 in FIG. 6. If, on the other hand, the number of nodes designated to receive the message is at or above that predetermined threshold number of nodes, then the message will first be sent as a broadcast message, and method 500 proceeds to block 502, where: (i) the server 300 (FIG. 3), operating in the host 102 (FIG. 1), sends a broadcast message to a broadcasting device (such as the hub 108 in FIG. 1); and (ii) the broadcasting device disseminates the broadcast message to the targeted nodes 200. Step (ii) contemplates, but does not require, the intermediate steps of sending the broadcast message to a repeater 114 (FIG. 1), and causing the repeater 114 to further disseminate the broadcast message to targeted nodes 200. The term "targeted nodes" as used in FIGS. 5 and 6, includes not only all nodes targeted with filtering information in a first broadcast attempt as described above with regard to FIG. 4 (or targeted via identification in a first direct message attempt) but also nodes from which responses to a broadcast (or direct) message were expected but not received in any given messaging attempt. FIGS. 5 and 6 use the term "node," but it shall be understood that the method 500 is equally applicable to other types of downstream devices in the AMI system 100 (FIG. 1). The broadcast message structure may resemble that of a hail message, e.g., the broadcast message, like a hail message, may have a preamble section and a data section, such sections described in U.S. patent application Ser. No. 15/583,263, filed May 1, 2017, now U.S. Pat. No. 10,178,617, incorporated by reference above. However, the data section of a broadcast message, instead of containing the hail message data described in that patent application, contains the Message Fields and corresponding values described above with regard to FIG. 4, in accordance with one example. Additionally, the broadcast message may be repeated in groups, in the same manner as disclosed with regard to hail messages in the aforementioned patent application incorporated by reference. Instead of alternating between two channels, however, a broadcast message may be repeated while sequentially cycling through all channels reserved for hailing of battery-powered nodes, such as non-frequency-hopping spread spectrum ("non-FHSS") channels described by way of example in the aforementioned patent application incorporated by reference.

Still referring to FIG. 5, method 500 advances from block 502 to block 504, where the server 300 indirectly (i.e., via the upstream progression described above) receives, a response from each node 200 successfully receiving the broadcast message, each such node 200 hereinafter referred to as a "responding node." The timing of responses that may be received from the responding nodes 200 is described above with regard to FIG. 4. Following receipt of a response, method 500 proceeds to block 506, where the server 300 compiles a list identifying each responding node and then stores the list in its memory, such as memory 308 of computer 302, this list previously described as the "second list" stored in memory 308 (FIG. 3). Next, at block 508, the server 300 compares the compiled "second list" with a list of identification of nodes that should have responded to the broadcast message (the "first list" described with regard to FIG. 3). At decision block 510, the server 300 determines whether it received any responses from downstream devices that were not targeted by the broadcast message ("responding non-targeted devices"). If server 300 received any response from a responding non-targeted device, then method 500 proceeds to block 512, where all responding non-targeted devices are restored to a pre-broadcast condition through additional data communications with those responding non-targeted devices. If the server 300 did not receive any responses from non-targeted devices, method 500 advances from decision block 510 to decision block 514, where the server 300 determines whether it received a response from all targeted nodes 200. If so, the method 500 skips to block 522, where it ends. If a response has not been received from all targeted nodes 200, the method 500 advances to block 516, where the server 300 ascertains the targeted nodes 200 identified in the first list from which the server 300 failed to receive a response. A value representing the number of such nodes is determined. Method 500 then advances to decision block 518, where it is determined whether a pre-defined broadcast limit has been reached (such as expiration of a pre-designated timeout period, or a predefined number of broadcasts). If the pre-defined broadcast limit has not been reached, method 500 loops back to block 501, where a new determination is made whether to re-send the message as a re-broadcast or, instead, as individual direct messages. The message will be re-sent as individual direct messages if the value determined at block 516 is below the aforementioned predetermined threshold number of nodes; otherwise, the message will be re-sent as a re-broadcast. Referring again to decision block 518, if it is determined that the pre-defined broadcast limit has been reached, method 500 advances to block 520, where the server 300 reports an error. The method 500 then ends at block 522.

FIG. 6 details the steps of method 500 involved with the sending of direct messages, instead of a broadcast message, to targeted nodes, responsive to the determination previously described at decision block 501 of FIG. 5. Upon a determination at that decision block that direct messages will be sent, method 500 advances to block 524 in FIG. 6, where direct messages are sent to targeted nodes. Direct messages are structured in the same manner described with regard to FIG. 4 as to broadcast messages, except that the Destination Address in the Filtering Information will designate one or more addresses other than "Broadcast Message." From block 524, method 500 advances to block 530, where the server 300 indirectly receives a response from each node 200 successfully receiving the direct message ("responding node"). The timing of the direct message responses received from the responding nodes 200 may be determined in the same manner as that described for responses to broadcast messages, described above with regard to FIG. 4. Following receipt of a response, method 500 proceeds to block 528, where the server 300 compiles a list identifying each responding node and then stores the list in the same manner described above with regard to FIG. 5. Next, at block 530, the server 300 compares the compiled list with a list of identification of nodes that should have responded to the direct messages, also in the same manner described above with regard to FIG. 5. Method 500 then advances from decision block 530 to decision block 532, where the server 300 determines whether it received a response from all targeted nodes. If so, the method 500 proceeds to block 534, where it ends. If a response has not been received from all targeted nodes 200, method 500 advances to decision block 536, where it is determined whether a pre-defined direct message limit has been reached (such as expiration of a pre-designated timeout period or number of direct message attempts). If that limit has not been reached, method 500 proceeds to block 538, where the server 300 identifies the nodes from which server 300 failed to receive a response to the direct messages. Method 500 then loops back to block 524, where the direct messages are again sent to each node from which server 300 failed to receive a response. If, on the other hand, the pre-defined direct message limit has been reached, method 500 advances to block 540, where the server 300 reports an error. The method 500 then ends at block 534.

The above description is provided as an enabling teaching in its best, currently known embodiments. To this end, those skilled in the relevant art will recognize and appreciate that many changes can be made to the various disclosed aspects described herein, while still obtaining the beneficial results of the present disclosure. It will also be apparent that some of the desired benefits can be obtained by selecting some of the features without utilizing or including other features. Accordingly, those who work in the art will recognize that many modifications and adaptations are possible and can even be desirable in certain circumstances and are a part of the present disclosure. Thus, the above description is provided as illustrative of the principles of the present disclosure and not in limitation thereof. In addition, as used throughout, the singular forms "a," "an" and "the" include plural referents unless the context clearly dictates otherwise. Thus, for example, reference to "a panel" can include two or more such panels unless the context indicates otherwise. Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances. As used herein, the terms "optional" or "optionally" mean that the subsequently described event or circumstance may or may not occur, and that the description comprises instances where said event or circumstance occurs and instances where it does not. It is further understood that the disclosure is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described disclosure, nor the claims which follow.

That which is claimed is:

1. A method of avoiding response signal collisions, comprising the steps of:

broadcasting a message from a broadcasting device to a plurality of downstream devices, the message containing response window information dictating whether each downstream device targeted in the message must respond to the message, and if so, when each targeted downstream device should send its response to the message after successfully receiving the message;

receiving a response from at least one downstream device in the plurality of downstream devices that was commanded to respond and that successfully received the message, each such downstream device comprising a responding device, wherein each responding device sends its response when performing an upload of data collected by the responding device; and determining whether every targeted downstream device successfully received the message, wherein, for required responses, the response window information is selected from at least one of the group comprising an instruction that each responding device commence its upload at a predefined recurring time, an instruction that each responding device perform its upload immediately following expiration of a pre-defined delay period commencing at a time of sending of the message, and an instruction that each responding device pick a random time within a predefined time window in which to perform its upload, wherein the broadcasting device receives the message from a server, and wherein the server has a memory containing a first list, the first list reciting identifications of all downstream devices from which a response to the message is expected, and containing a second list, the second list reciting identifications of all responding devices, and wherein the step of determining whether every downstream device targeted in the message successfully received the message further comprises the steps of comparing the first list to the second list, ascertaining whether the server failed to receive a response to the message from any downstream device identified in the first list, and re-broadcasting the message to each downstream device from which the server failed to receive a response, wherein the step of determining whether every downstream device targeted in the message successfully received the message further comprises the steps of:

receiving, from each downstream device successfully receiving a re-broadcast message, each such device comprising a re-broadcast responding device, a response when each re-broadcast responding device performs an upload of data collected by each re-broadcast responding device, a time of each upload dictated by the response window information, producing an updated second list by adding, to the second list, identifications of each re-broadcast responding device, comparing the first list to the updated second list, ascertaining whether the server failed to receive a response to the re-broadcast message from any downstream device identified in the first list, determining whether a pre-defined limit on a number of broadcasts has been reached, and responsive to determining that the pre-defined limit on the number of broadcasts has not been reached, again re-broadcasting the message to all downstream devices from which the server has still failed to receive a response.

2. The method of claim 1, wherein the group further comprises identification of a quiet period within the pre-defined time window during which time a response may not be sent by the responding device.

3. The method of claim 1, further comprising sequentially repeating the steps of receiving, producing an updated second list, comparing, ascertaining, determining, and again re-broadcasting until occurrence of an event selected from one of receipt of responses from all downstream devices identified in the first list, a reaching of the pre-defined limit on the number of broadcasts, and a falling of a value below a predetermined threshold, the value indicating a number of downstream devices from which the server has still failed to receive a response.

4. The method of claim 3, further comprising the step of, responsive to the falling of the value below the predetermined threshold, sending a direct message individually to each downstream device from which the server has still failed to receive a response.

5. The method of claim 1, wherein the message contains filtering information targeting only a subset of the plurality of downstream devices, the filtering information comprising at least one of hardware type, hardware sub-type, and operational mode.

6. The method of claim 5, wherein the filtering information further comprises a message number, such that for downstream devices that already successfully received a message with the message number, any re-broadcasts of messages containing the message number may be disregarded.

7. The method of claim 1, further comprising the steps of:

determining whether a response to the message was received from any downstream device that was not targeted in the message, each such downstream device comprising a responding non-targeted device; and responsive to determining that a response to the message was received from a responding non-targeted device, restoring each responding non-targeted device to a pre-broadcast condition.

8. A method of avoiding response signal collisions, comprising the steps of:

broadcasting a message from a broadcasting device to a plurality of downstream devices, the message containing timing instructions specifying a time at which each downstream device should send its response to the message after successfully receiving the message; and determining whether every downstream device targeted in the message successfully received the message by receiving a response from each downstream device successfully receiving the message, each such downstream device comprising a responding device, wherein each responding device sends its response when performing an upload of data collected by the responding device, a time of each upload dictated by the timing instructions, wherein the broadcasting device receives the message from a server, the server having a memory containing a first list, the first list reciting identifications of all downstream devices from which a response to the message is expected, and containing a second list, the second list reciting identifications of all responding devices, wherein the step of determining whether every downstream device targeted in the message successfully received the message further comprises the steps of comparing the first list to the second list, ascertaining whether the server failed to receive a response to the message from any downstream device identified in the first list, re-broadcasting the message to each downstream device from which the server failed to receive a response, receiving, from each downstream device successfully receiving a re-broadcast message, each such device comprising a re-broadcast responding device, a response when each re-broadcast responding device performs an upload of data collected by each re-broadcast responding device, a time of each upload dictated by the timing instructions, producing an updated second list by adding, to the second list, identifications of each re-broadcast responding device, comparing the first list to the updated second list, ascertaining whether the server failed to receive a response to the re-broadcast message from any downstream device identified in the first list, determining whether a pre-defined limit on a number of broadcasts has been reached, and responsive to determining that the pre-defined limit on the number of broadcasts has not been reached, again re-broadcasting the message to all downstream devices from which the server has still failed to receive a response.

9. The method of claim 8, further comprising sequentially repeating the steps of receiving, producing an updated second list, comparing, ascertaining, determining, and again re-broadcasting until occurrence of an event selected from one of receipt of responses from all downstream devices identified in the first list, a reaching of the pre-defined limit on the number of broadcasts, and a falling of a value below a predetermined threshold, the value indicating a number of downstream devices from which the server has still failed to receive a response.

10. The method of claim 9, further comprising the step of, responsive to the falling of the value below the predetermined threshold, sending a direct message individually to each downstream device from which the server has still failed to receive a response.

* * * * *